Figure 1:
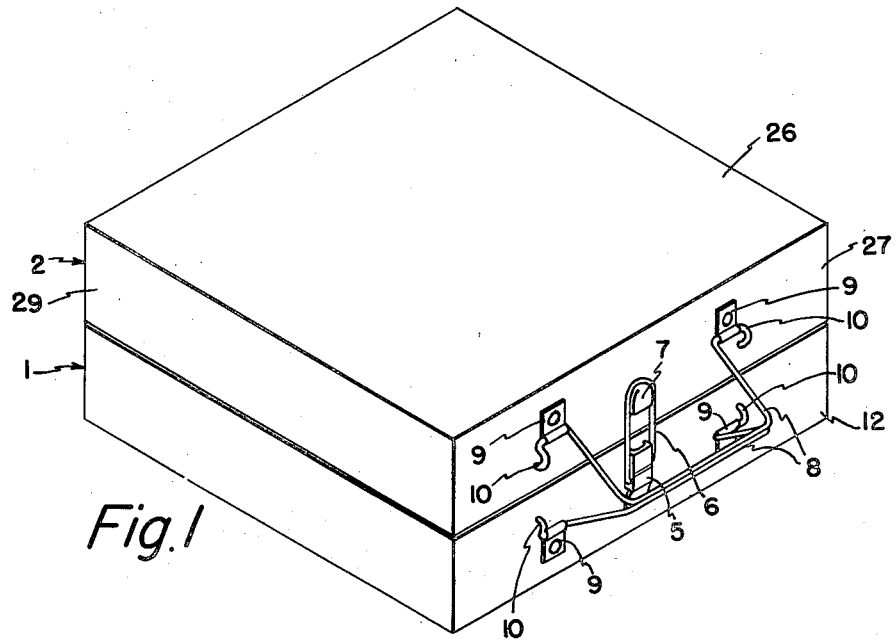

July 8, 1952  M. J. MADISON  2,602,231
SURVEYOR'S LEVEL

Filed Aug. 12, 1950  2 SHEETS—SHEET 1

INVENTOR.
MARTIN J. MADISON
BY J. Stuart Freeman
ATTORNEY

July 8, 1952 M. J. MADISON 2,602,231
SURVEYOR'S LEVEL
Filed Aug. 12, 1950 2 SHEETS—SHEET 2

INVENTOR.
MARTIN J. MADISON
BY J. Stuart Freeman
ATTORNEY

Patented July 8, 1952

2,602,231

UNITED STATES PATENT OFFICE 2,602,231

SURVEYOR'S LEVEL

Martin J. Madison, Takoma Park, Md.

Application August 12, 1950, Serial No. 179,071

17 Claims. (Cl. 33—72)

The object of the invention is to provide improvements in automatically leveled bases upon which various instruments can be mounted, such for example as the transits and leveling telescopes used by surveyors, but primarily of a highly rugged and simplified construction such as is adapted for use by anyone who can sight the horizontal and vertical fibers or cross hairs of a high-priced professional instrument, but who is not necessarily qualified as a trained surveyor.

Levels having a high degree of efficiency have long been available, but involve such high cost and specialized workmanship, while requiring exceptional skill and training in order to operate them, that they are almost in every instant owned and operated only by civil engineers and surveyors, wherefore artizans and contractors in general must employ an engineer to run a series of simple levels the same as they have to employ them for running any given line, and if a full time engineer is not on their staff they must wait until one is available, and then pay the fees that characterize such specialized training.

The running of levels and transit lines is an inherent and unavoidable phase of all such work as providing for and the laying of gas, water and sewer pipe, leveling ground areas such as athletic fields, airports, swimming pools and the like, preparing for and laying streets, sidewalks and concrete, frame and masonry structures, and in all cases in which either a permanently level condition is required, or in which the slope is a predetermined number of degrees and fractions thereof from the horizontal. In such work the contractor and/or a foreman or other employee frequently needs to check the work, and therefore needs an instrument that he can carry by hand or in his car, that occupies but a small space and which in general does not require the specialized care demanded by the usual transit and surveyor's level, that can be set up upon any available foundation such as a box, barrel, stump, or in fact any other available base, and which in any such case requires but a minimum leveling by the usual bubbles of so-called spirit-levels, and at that only for the final adjustment of the telescope with respect to the base or supporting portion of the device.

Another object, therefore, is to provide an inexpensive leveling device of the utmost simplicity, one that can be hurriedly set up and operated practically anywhere and under practically any conditions by unskilled as well as by skilled labor, and which essentially comprises a readily portable case in which is positioned a float, and which case is adapted to contain water or any other liquid for freely supporting such float, a telescope mounted upon said float but upon the outside of said case, a universal, liquid-proof, anti-friction bearing or joint for connecting said float and said telescope to said case, and preferably also a cover for protecting said telescope and associated parts when the device is not in use.

Further objects reside in the provision of a telescope locking device for securing the telescope with respect to the case when not in use and while being transported from one place to another; a float-stabilizing medium for limiting the otherwise relatively unrestrained free movement of the float from side to side when not in use, but which does not limit the vertical and normal rocking movements of said float when functioning operatively; an anti-slosh construction which damps the otherwise practically unrestrained sloshing of the float-supporting liquid within the case; a counterbalance weight that is carried by the telescope and which is readily adjusted to offset the changes in the longitudinal position of the center of mass thereof, during and to a degree proportioned to the adjustment of the usual eyepiece as the telescope is focused upon a given point; a demountable cover for the combined case and telescope, that with a specially designed pair of bales makes it easy to grip and carry the complete device from place to place; a float construction that is both inexpensive and efficient and which is fully adequate to perform the functions for which it is intended; a non-leak joint between the telescope mounting and the top of the base-tank; a simple form of universal joint for permitting freedom of oscillation of the telescope with respect to said base in three dimensions; a readily removable disc panel that can be detached from the base and which carries the telescope, and by the removal of which makes it a matter of the utmost simplicity to remove, repair, and replace the float or the anti-slosh baffles, and to thoroughly clean the interior of said base; together with other details of construction and operation which are hereinafter fully brought out in the following description, when read in conjunction with the accompanying drawings.

Figure 2:
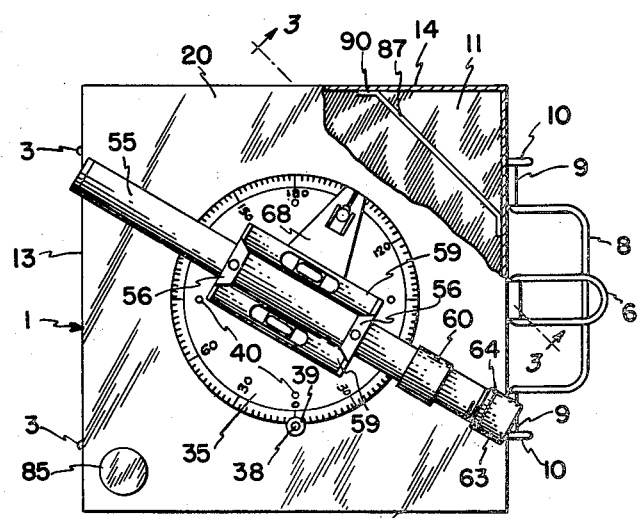
Figure 3:
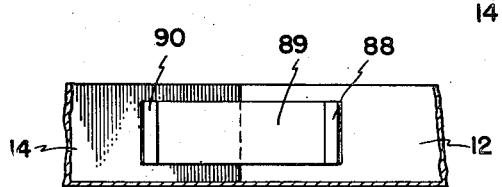
Figure 4:
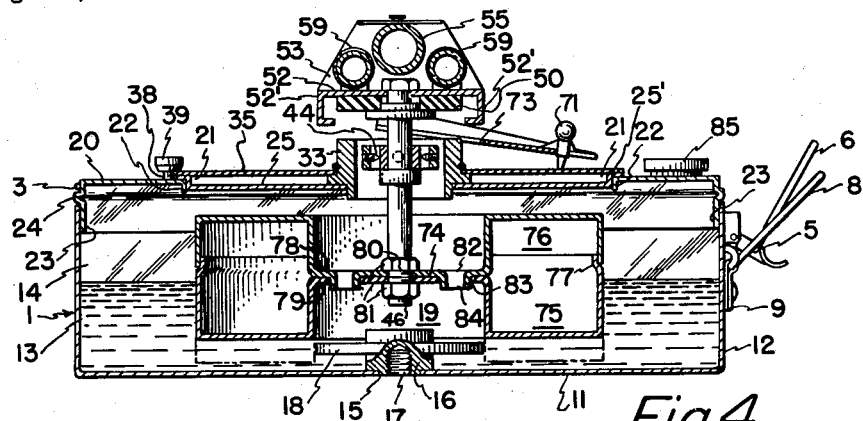
Figures 5, 9:
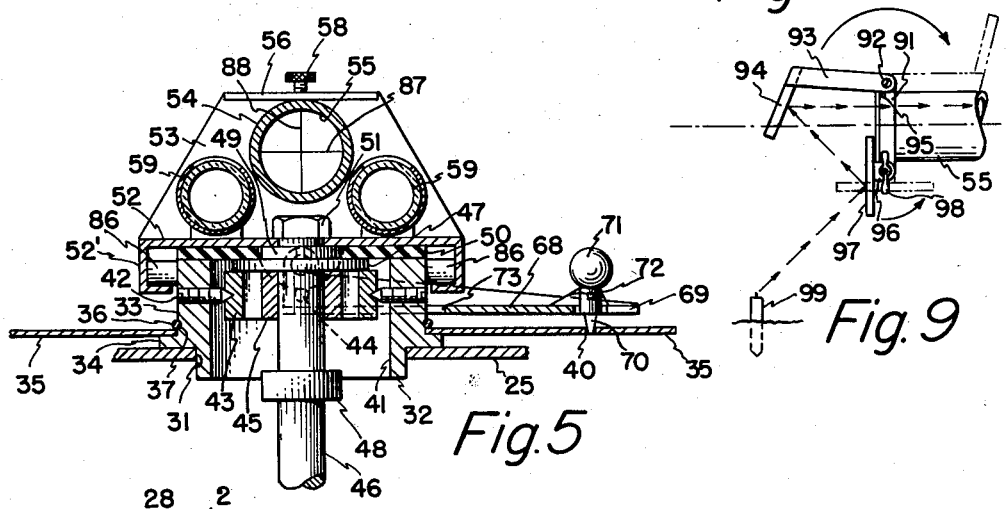
Figures 6, 7:
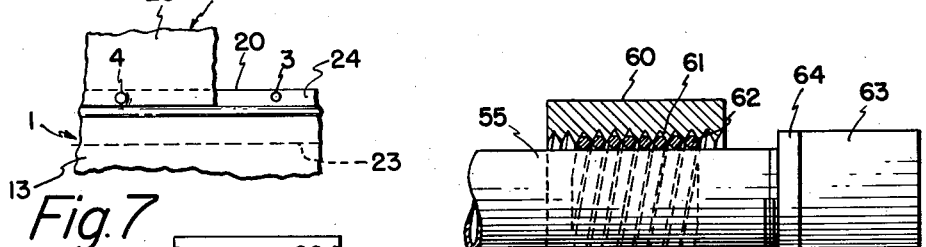
Figure 8:
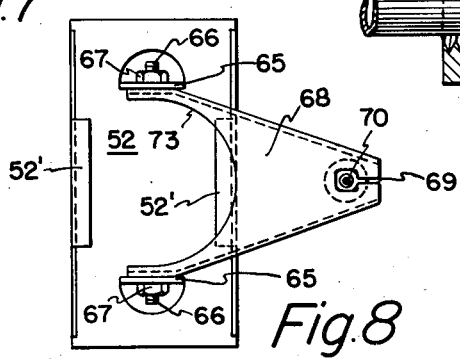

In the drawings Fig. 1 is a perspective view of a device comprising one embodiment of the invention in closed form for accommodating it to ready transportation from place to place; Fig. 2 is a plan view of the principal elements of the device with the cover shown in Fig. 1 removed therefrom; Fig. 3 is a fragmentary vertical section on the line 3—3 of Fig. 2; Fig. 4 is a vertical diametrical section through the device as a whole except for the cover; Fig. 5 is an enlarged fragmentary portion of the same cross section but showing the telescope carriage in depressed position, as when the device is prepared for transportation; Fig. 6 is a fragmentary elevation of the eye-piece end portion of the telescope with its slidable counterbalance shown in section; Fig. 7 is a fragmentary detail showing a means for detachably securing the cover to the base portion of the device; Fig. 8 is a bottom plan view of the arm for determining the angle of and/or locking the telescope, and the pivotal supports for said arm; and Fig. 9 shows a mirror system attached to the telescope.

Referring to the drawings, the preferred embodiment of the invention is here shown as comprising base and cover sections 1 and 2, respectively, which are normally separated, but which when not in use, as while being transported from place to place, are secured together as indicated in Figs. 1 and 2. For this purpose any suitable disconnectable securing means may be employed, but as here shown comprises one or more lugs 3 carried by the base, and a corresponding number and position of holes or recesses 4 provided in the cover for receiving said lug or lugs (Fig. 7). Additionally, said base is provided with a trunk latch 5 or the like having a hingedly mounted bale 6, that operatively engages a suitable lug 7 carried by said cover, when said base and cover are in closed relation.

To facilitate carrying the device as a unit, a pair of wire bales 8 are provided, one of which is hingedly secured to said base while the other is similarly secured to said cover in each instance by means of brackets 9. If preferred, this construction may be considered as complete at that point, but if desired the opposite end portion 10 of each of said bales, after extending through the respective brackets, may be bent outwardly and thence looped reversely inwardly towards said base and cover, respectively, in planes perpendicular to the axes of oscillation of said bales, in order to thereby provide means to limit the movement of said bales towards each other. By this construction, said bales are free to move towards each other just about as far as necessary for their central hand-gripping portions to meet in parallel juxtaposition, while preventing them from overlapping and/or becoming interlocked, as would otherwise be the case.

*The base.*—The base 1 may be of any suitable shape, but is here shown as comprising a generally rectangular box-like element comprising a bottom 11, front 12, rear 13 and opposite side walls 14. This relationship, as shown in Fig. 4, represents the base and the parts directly carried thereby when in normal use, but when being carried or resting inoperative in upright position, said rear becomes the base and said front becomes the top. The normally bottom wall 11 is provided with an aperture 15, which is filled by a plug 16 whose major portion is upon the inside of said base, and is provided with an outwardly opening threaded recess 17 for the reception of the correspondingly threaded bolt or lug, with which a surveyor's tripod (not shown) is provided. Unitarily secured to or comprising an integral part of said plug is an annular flange 18, that is preferably spaced above said bottom wall 11, and comprises a means for damping the otherwise relatively free movement of the annular float 19, as hereinafter explained.

The front wall of said base is provided with trunk latch 5 and a pair of the bale-securing brackets 9 hereinbefore referred to. A closure for the otherwise open upper portion of said base comprises a preferably flat sheet metal top member 20, that is provided centrally with an annular opening 21 defined by a peripheral, downwardly projecting, stiffening flange 22, while radially outwardly said closure member 20 is provided with a peripheral flange 23, that is of the same shape as but slightly smaller than the inside dimensions of the walls, so that it telescopes with a sliding fit into the lower portion of said base, its limit of downward movement therein being defined by an outwardly projecting heading, corrugation, or series of lugs, or the equivalent 24, that being carried by the flange of said sheet metal member 20 engage the upper edges of the base walls 12, 13 and 14. The opening 21 is normally closed by any suitable disc that can be removed when necessary, and is here shown for example as being spanned and closed by a "paint-can" disc 25, that is characterized by the usual L-shaped flange 25' that both insures a normally tight fit and limits the extent to which said disc can be depressed into said opening.

*The cover.*—The cover 2, essentially comprises a plane top 26, a front wall 27, a rear wall 28 and side walls 29. Said rear wall is provided with one or more apertures 4 that correspond with and are adapted to receive the securing lugs 3, while the said front, rear and side walls of said cover closely surround the corresponding edges of the flat sheet metal member 20 of said base, and are adapted to rest upon the corrugation 24 of said base top as a means of limiting the movement of said cover downwardly. When said base and said cover are operatively united as shown in Fig. 1 with the bales 8 in the positions also shown, said bales may be gripped as handles and the device carried conveniently from one location to another, the trunk-lock 5—7 being also secured as also shown in order that said base and cover will be maintained in close relationship without depending solely upon the gripping of both of said bales by the hands in carrying position.

*The telescope support.*—The so-called paint-can closure disc 25 is provided centrally with an aperture 31, within which is suitably secured the depending reduced flange 32 of a hollow cylindrical member 33, that is provided with a radial flange 34 which rests upon said disc 25 and limits the downward movement of said member with respect thereto. Resting upon said last-mentioned flange and surrounding said cylindrical member is a disc 35, that is held in position vertically yet permitted to be shifted angularly or circumferentially by means of a radial spring wire or the like 36, that is positioned in an annular groove 37 in the outer surface of said member, and in slightly spaced relation with respect to the adjacent surface of said radial flange 34. Said sheet metal top member 20 is provided at one point adjacent to but slightly spaced from said last-mentioned disc 35 with a threaded stud 38, that adjustably carries a clamping nut 39, which when in a lower position binds the adjacent portion of the disc 35 against the L-shaped flange 25' of the closure disc 25. Said disc is accurately graduated upon its upper surface in degrees of a circle, and is also provided with a plurality of angularly spaced holes or recesses 40, and after loosening the set screw 39 and setting the "zero" of said disc at a given predetermined position, said disc may be turned, as for example, until the point "0" is opposite or corresponds with the position of the set screw, and the set screw tightened to secure the disc in such position for as long as may be desired. The use made of this disc setting will be subsequently discussed with relation to the telescope.

The cylindrical member 33 is provided with an axially positioned bore 41 into which radially extend diametrically positioned set screws 42, that serve as pivotal supports for a ring 43 that in turn carries diametrically positioned, inwardly projecting set screws 44, that serve as pivotal supports for a second and smaller ring 45, through which is slidably positioned a vertical shaft 46. This shaft is provided with vertically spaced upper and lower collars 47 and 48, which limit the extent of the vertical movement of said shaft, while a reduced upper portion 49 forms a means for positioning an annular gasket of rubber or other resilient material 50, the radially inner portion of said gasket resting upon the larger base portion of said upper collar, while the radially outer portion of said gasket in its lowermost position rests directly upon the uppermost surface of said cylindrical member 33, and when in its uppermost position (as limited by the position of the lower collar 48) is spaced from said last-mentioned member.

The uppermost end of said shaft 46 is provided with a nut 51, that binds against said reduced upper portion 49 of the base 52 of a sheet metal member, the longitudinally opposite ends of which are upturned at 53, and provided with aligned apertures 54 through which extends a telescope 55. The uppermost portions of said telescope-supporting ends are inturned at 56, and provided with threaded apertures for the reception of set screws 58, that when in normally tight operative position bind against said telescope and maintain the same against longitudinal shifting in and with respect to said upturned supports. Upon the laterally opposite sides of said telescope are positioned a pair of spirit levels 59, that are in the same horizontal plane but independently mounted upon said base 52, in order by their bubbles to indicate when the axis of said telescope is in perfectly horizontal position, while the vertical angularity of said telescope is varied at will by a counter-weight 60.

This counter-weight comprises a sleeve or somewhat elongated ring having a coarsely threaded axial bore 61, in which is positioned a wire helix 62 that frictionally engages the surface of said telescope, and which while permitting longitudinally slideable movement to effect a coarse adjustment of the balance, likewise makes possible a fine and delicate adjustment when rotated spirally as defined by the frictional engagement of said helix with the surface of said telescope, when used to counterbalance a condition of off-balance caused by adjustment of the eye-piece 63. Thus, upon adjusting said eyepiece and securing it in such adjusted position by means of a locknut 64, and thereby causing a condition of off-balance, correct balance is again restored first by a coarse shifting of the longitudinal position of said counter-weight 60, and then relatively minutely altering its position by rotating said counter-weight spirally, as determined by the pitch of said helix 62.

The telescope base 52 is also preferably provided with downwardly extending parallel ears or lugs 65, through which slidably extend pivot screws 66, that carry locknuts 67 and extend in opposite directions from a plate 68, that is tapered outwardly and projects freely from one side of said base member, to provide a vertically oscillatable arm that extends radially across the graduated disc 35, and is provided at its free end with a radial slot 69 through which the graduations of said disc are visible. The inner end of said slot is widened to provide for the passage of a depending pin 70, that is adapted to enter any one of the disc apertures 40, and which is provided upon its upper end with a manually engageable knob 71, while said pin as a whole is pivotally mounted in a suitable bracket 72, that is secured to the upper surface of said plate arm adjacent to said slot, so that said pin can be lifted out of and free from any one of said disc apertures, and shifted to and positioned in another of said apertures upon loosening of the set screw 39. The pivotally mounted inner end portion of the plate 68 is cut away in a wide arc at 73, to prevent engagement of said plate with the cylindrical member 33 at any time, and thereby makes possible engagement of the pin 70 in a given disc aperture, when the telescope-supporting shaft is in either extreme vertical position, and also by reason of the angular adjustability of said pin in a vertical plane. By this construction and although there is no vernier adjustment provided in this, a relatively simple embodiment of the invention, the instrument is capable of use to a fairly close degree of accuracy as a transit, in addition to its primary use as a leveling instrument or so-called level. By the addition of a vernier and somewhat greater precision in manufacture fully accurate surveying is possible.

*Telescope float support.*—The float support for the telescope may be of any desired and suitable type, but is here shown as comprising a doughnut shape with a substantially centrally positioned web or spider 74. The float proper comprises lower and upper, transversely U-shaped cross section members 75 and 76, respectively, the edges of the radially outer walls of which telescope slightly at 77, and are sealed together to provide a water-tight joint, while the radially inner walls of said sections are also in alignment, and respectively form integral extensions of plane central disc sections 78 and 79, which are also sealed in water-tight relationship. These central sections are provided with aligned axially positioned apertures 80, through which extends the lower end of the shaft 46, the proper predetermined position of said float as a whole with respect to said shaft being maintained by and between a pair of nuts 81. Said central sections are also provided with one or more alignment apertures 82 and 83. In addition to being in alignment, one of said apertures (the lower in this illustration, Fig. 4) is slightly larger than the upper, while the metal of the other smaller aperture is preferably deflected and slightly drawn, so as to form a short cylindrical extension 84, that in each instance projects through the larger aligned aperture and serves to prevent water splash from entering between the adjacent surfaces of said central sections. The base 1—2 is filled through a port 85, and if the float-supporting liquid is of anti-freeze nature, it is retained in said base, whereas if it is plain water it may be occasionally drained if desired.

Referring to Fig. 4, it will be noted that the internal diameter of said float is but slightly greater than the diameter of the flange 18 of the plug 16, these parts in fact being only freely slideable with respect to each other, so that in the lower position of said float, where the telescope mount has been depressed in the liquid to locked position, said flange prevents said float from moving laterally, as when the device as a whole is being carried as hereinbefore described. This lower position of said float, and likewise of the telescope and other elements carried by it, are maintained whenever and as long as necessary by first depressing the telescope and its mounting, until the depending inturned flanges 52' of the telescope support 52 are below the level of a pair of diametrically oppositely positioned lugs or undercut shoulders 86, carried by the upper portion of the outer surface of the cylindrical member 33, after which said telescope and its mounting are angularly shifted until said flanges pass beneath said shoulders, and the said gasket 50 is compressed between said support 52 and said cylindrical member 33. Then, upon releasing said telescope and mounting, it will be found that they are firmly held against both axial and longitudinal movement and vibration, until manually reshifted in the reverse angular direction. Upon thus reversely shifting said telescope it becomes released from said flange and lug engagement, so that said float is freed from engagement with said restraining flange 18 and permitted to rise, until the lower shaft flange 48 rises to and is stopped by its engagement with said shaft collar 45, after which the universal joint and support comprising the elements 42—45 permits said telescope and the usual transverse crosshair 87 to automatically assume a constantly horizontal position, while the upright crosshair 88 simultaneously assumes a vertical position, the former being for leveling operations, while the latter are for surveyors' transit operations.

When operating the device as a transit, and it is desired to run a line at a definite angular degree from a given point, the lock nut of the disc is first loosened and said disc is turned by hand until the pin picks up and enters the hole at zero, while the telescope is maintained in line with the last sight, which represents a previously established base line. The locknut that secures said disc is then tightened, and the pin is moved to any other angle, or to the 90° hole, either to the right or to the left, as when squaring off a rectangular building.

Or, in view of the lightness of the device as a whole, the pin 70 may be set for example in the hole at zero and the set screw 39 also tightened at zero, whereupon the base and telescope as a unit are delicately turned upon a box, wall, table, or other convenient and stable support, until the vertical cross hair of the telescope is sighted upon a distant point in the base line. Then by withdrawing the pin from the zero hole and turning the telescope while the set screw 39 remains tightened, the telescope is turned a predetermined angle, or is turned until the vertical crosshair registers with a point in a line that runs at some unknown angle with respect to such base line, and the deflection noted by the new position of the arm slot 69 upon said disc. If preferred, the pin may be permitted to remain in a given disc hole, and from a starting point with the set screw 39 at zero, said telescope and said disc are rotated together until an angle is noted between the deflected position of said arm slot and said zero.

For minimizing the sloshing of the water (or other liquid) within the device, as when it is being carried or otherwise transported from place to place, it is preferable to provide some form of anti-slosh means, and one of the simplest forms of such means is the provision of a diagonally extending plate or strap in each corner of the base 1. Each of these plates comprises a central portion 89 and angularly deflected terminal portions 90, said terminal portions being firmly secured as by soldering to adjacent side walls of said base, so that said central portion extends diagonally across and in substantial spaced relation with the intervening corner angle. The height of these plates is less than that of the interior of said base, so that the float-supporting liquid can readily flow behind them both above and below their vertical limits. Obviously other types of such means may be employed as to number, shape and arrangement, but this simple embodiment will serve to illustrate the function played by an improved device of this nature.

Referring to Fig. 9, to the objective end of the telescope tube 55 is secured a band 91, which is preferably of such width at its upper end as to provide a pivotal support 92 for a pair of parallel arms 93, that when extending into their outermost operative position support between them a mirror 94, whose lower edge is preferably no lower than the horizontal axis of said telescope. Said mirror and arms are limited in their downward movement by any suitable form of stop 95, while when not in use said mirror and arms may be raised or retracted to the inoperative position shown by the dash-and-double-dot lines above said telescope.

The lower end of said band is shaped substantially like the upper end, and to it is pivotally secured a pair of short arms 96, that together carry upon their outer ends a second mirror 97, the upper edge of which is preferably not higher than the level of the bottom of the inner surface of the telescope tube, while its angular position is adjusted manually by means of a suitable finger-engageable knob, wheel, radiating spokes, or the like 98, said second mirror when not in use being shifted angularly to the dash-and-double-dot position indicated beneath said telescope.

This mirror system is used in order to bring the image of a stake 99, or other point indicator, in the lower half of the field of view of the telescope into alignment with the vertical cross hair in the upper half of the same, in order to thereby facilitate alignment of the telescope's axis both with a distant object and above a nearer point, such as that identified by the nearby stake, which is well below the line of said axis. On the other hand, when such an alignment is not being effected, said mirrors may be withdrawn into their inoperative positions as indicated.

Having thus described my invention, what I claim and desire to protect by Letters Patent of the United States is:

1. The combination of a support for a surveyor's type of telescope, with a tank comprising a base section and a cover section having an aperture, and a disc closure for said aperture to which said telescope support is secured.

2. The combination of a support for a surveyor's type of telescope, with a tank comprising a base section and a cover section having an aperture, a disc closure for said aperture to which said telescope support is secured, and a universal connection between said disc and said telescope support.

3. The combination of a support for a surveyor's type of telescope, with a tank comprising a base section and a cover section having an aperture, a disc closure for said aperture to which said telescope support is secured, a universal connection between said disc and said telescope support, means to lock said telescope support in fixed relation to said tank, and a liquid seal surrounding and closing the joint between said support and said disc while they are in locked position.

4. The combination of a support for a surveyor's telescope, with a polygonal tank to hold a liquid to buoyantly support said telescope support, and diagonally positioned baffles fixedly secured to the sides of said tank and spanning the intervening angle in each instance, said baffles being of less height than the sides of and spaced from the bottom of said tank, to permit liquid to pass freely above and below them.

5. The combination of a support for a surveyor's type of telescope, with a tank normally holding a liquid to buoyantly support said telescope support, a float within said tank provided with a recess in its lower portion, means to secure said float and telescope support in a lower inoperative position when not in use, and fixed means in the bottom of said tank and engageable with the sides of said recess to restrain said float against lateral movement when in lowered position.

6. The combination of a support for a surveyor's type of telescope, with a tank normally holding a liquid to buoyantly support said telescope support, means to secure said float and telescope support in a lower inoperative position when not in use, an upwardly extending projection from the bottom of said tank, and said float when in a lower position being engageable with said projection to restrain said float against lateral movement when in such lowered position.

7. The combination of a telescope, with a holder comprising a base portion provided with depending inwardly directed lugs, a shaft depending from said base and provided upon its lower portion with a float, a tank to contain liquid for said float, a top for said tank having an aperture through which said shaft freely extends, a cylindrical element surrounding said aperture and carried by said top, a gasket between said element and said holder base, and shoulders carried by said element and engageable by said lugs when said base is in a lowered position to compress said gasket and prevent escape of liquid from said tank through said aperture, and to fixedly secure said telescope with respect to said tank.

8. The combination of a telescope, with a holder comprising a base portion provided with depending inwardly directed lugs, a shaft depending from said base and provided upon its lower portion with a float, a tank to contain liquid for said float, a top for said tank having an aperture through which said shaft freely extends, a cylindrical element surrounding said aperture and carried by said top, a gasket between said element and said holder base, shoulders carried by said element and engageable by said lugs when said base is in a lowered position to compress said gasket and prevent escape of liquid from said tank through said aperture, and to fixedly secure said telescope with respect to said tank, and a universal joint between said element and said shaft to permit universal movement of said telescope when in raised operative position.

9. The combination of a telescope, with a holder comprising a base portion provided with depending inwardly directed lugs, a shaft depending from said base and provided upon its lower portion with a float, a tank to contain liquid for said float, a top for said tank having an aperture through which said shaft freely extends, a cylindrical element surrounding said aperture and carried by said top, a gasket between said element and said holder base, shoulders carried by said element and engageable by said lugs when said base is in a lowered position to compress said gasket and prevent escape of liquid from said tank through said aperture, and to fixedly secure said telescope with respect to said tank, a graduated disc carried by said element, means to fix said disc against angular movement while in a predetermined axial relationship with respect to said element, and disengageable means to secure said telescope holder in fixed azimuthal relationship with respect to said disc.

10. The combination of a telescope, with a holder comprising a base portion provided with depending inwardly directed lugs, a shaft depending from said base and provided upon its lower portion with a float, a tank to contain liquid for said float, a top for said tank having an aperture through which said shaft freely extends, a cylindrical element surrounding said aperture and carried by said top, a gasket between said element and said holder base, shoulders carried by said element and engageable by said lugs when said base is in a lowered position to compress said gasket and prevent escape of liquid from said tank through said aperture and to fixedly secure said telescope with respect to said tank, a universal joint between said element and said shaft to permit universal movement of said telescope when in raised operative position, a graduated disc carried by said element, means to fix said disc against angular movement while in a predetermined axial relationship with respect to said element, and disengageable means to secure said telescope holder in fixed azimuthal relationship with respect to said disc.

11. The combination of a telescope with a normally floating support, a longitudinally adjustable eyepiece, an internally threaded sleeve loosely surrounding said telescope and a helix within and positioned by the threads of said sleeve and slideably engaging the surface of said telescope.

12. The combination of a telescope, with a holder comprising a base portion provided with depending inwardly directed lugs, a shaft depending from said base and provided upon its lower portion with a float, a tank to contain liquid for said float, a top for said tank having an aperture through which said shaft freely extends, a cylindrical element surrounding said aperture and carried by said top, a gasket between said element and said holder base, shoulders carried by said element and engageable by said lugs when said base is in a lowered position to compress said gasket and prevent escape of liquid from said tank through said aperture and to fixedly secure said telescope with respect to said tank, a universal joint between said element and said shaft to permit universal movement of said telescope when in raised operative position, a graduated disc carried by said element, means to fix said disc against movement while in a predetermined axial relationship with respect to said element, disengageable means to secure said telescope holder in fixed azimuthal relationship with respect to said disc, the engagement of said helix with said telescope permitting either rough adjustment by rectilinear movement of said sleeve, or fine adjustment by a spiral movement of said sleeve as defined by the pitch of said helix.

13. The combination of a tank adapted to contain a liquid, a float normally supported by said liquid, a telescope supported by said float, means to temporarily secure said telescope and said float against movement with respect to said tank, said tank being provided upon one side with a laterally extending lug and upon the opposite side with a locking device, and a cover for said tank and telescope provided upon one side with means to engage said lug and upon the opposite side with a complementary locking device.

14. The combination of a tank adapted to contain a liquid, a float normally supported by said liquid, a telescope supported by said float, means to temporarily secure said telescope and said float against movement with respect to said tank, said tank being provided upon one side with a laterally extending lug and upon the opposite side with a locking device, and a cover for said tank and telescope provided upon one side with means to engage said lug and upon the opposite side with a complementary locking device, and a pair of bales carried by said tank and said cover, which when simultaneously gripped are operative for carrying the complete device as a unit and also aiding in maintaining said cover in operative relation with respect to said tank.

15. The combination of a tank adapted to hold a liquid, and a cover therefor having an aperture, a float within said tank, a telescope above said cover, a shaft extending freely through said aperture and supporting said telescope above and in fixed relationship with respect to said float, said float comprising a hollow annular body portion consisting of a pair of substantially complementary ring members surrounding aligned hollow spaces, each of said members having a central web portion provided with registering apertures, and means to secure said web portions together and to the lower end of said shaft.

16. The combination of a tank adapted to hold a liquid, and a cover therefor having an aperture, a float within said tank, a telescope above said cover, a shaft extending freely through said aperture and supporting said telescope above and in fixed relationship with respect to said float, said float comprising a hollow annular body portion consisting of a pair of substantially complementary ring members surrounding aligned hollow spaces, each of said members having a central web portion provided with registering apertures, and means to secure said web portions together and to the lower end of said shaft, said shaft extending through a pair of said apertures, and adjustable nuts carried by said shaft and operative to secure said web portions together and at an adjustable height upon said shaft.

17. The combination of a body of liquid, with a float normally supported thereby, a telescope carried by said float with its axis parallel with the surface of said liquid, and a system of mirrors mounted upon the objective end of said telescope, and comprising a mirror obstructing a portion of the field of said telescope, and a second mirror outside the field of said telescope operative to reflect light rays from an object to one side of the field of said telescope into said first mirror and thence to the eyepiece of said telescope for comparison with light rays from a second object entering another portion of the field of said telescope, said first mirror being normally at a fixed angle and pivotally supported to permit its being retracted to a lateral inoperative position with respect to said telescope, and said second mirror being manually adjustable angularly while in operative position, and also pivotally mounted to permit its being similarly retracted.

MARTIN J. MADISON.

REFERENCES CITED

The following references are of record in the file of this patent:

UNITED STATES PATENTS

| Number | Name | Date |
| --- | --- | --- |
| 701,612 | Prier | June 3, 1902 |
| 1,191,073 | Hammond | July 11, 1916 |
| 1,208,639 | Pidgeon | Dec. 12, 1916 |
| 1,966,850 | Colt | July 17, 1934 |

FOREIGN PATENTS

| Number | Country | Date |
| --- | --- | --- |
| 326,209 | France | Feb. 14, 1903 |